US006892760B2

(12) United States Patent
Roos et al.

(10) Patent No.: US 6,892,760 B2
(45) Date of Patent: May 17, 2005

(54) SELF CLOSING COUPLING

(76) Inventors: Paul François Roos, 16 Bertie Avenue, 7475 Epping 2 (ZA); David William Connelly, 16 Bertie Avenue, 7475 Epping 2 (ZA)

( * ) Notice: Subject to any disclaimer, the term of this patent is extended or adjusted under 35 U.S.C. 154(b) by 139 days.

(21) Appl. No.: 10/311,957

(22) PCT Filed: Jun. 20, 2001

(86) PCT No.: PCT/IB01/01083

§ 371 (c)(1), (2), (4) Date: Dec. 20, 2002

(87) PCT Pub. No.: WO01/98158

PCT Pub. Date: Dec. 27, 2001

(65) Prior Publication Data

US 2003/0106610 A1 Jun. 12, 2003

(30) Foreign Application Priority Data

Jun. 21, 2000 (ZA) .......................................... 2000-3105

(51) Int. Cl.[7] ................................................ F16L 37/28
(52) U.S. Cl. ............................ 137/614.03; 251/149.06; 251/902
(58) Field of Search ................ 137/614.03; 251/149.06, 251/902; 222/105, 518, 519

(56) References Cited

U.S. PATENT DOCUMENTS 3,206,075 A * 9/1965 Scholle ....................... 222/518
4,421,146 A 12/1983 Bond et al.
4,564,132 A 1/1986 Lloyd-Davies
4,890,642 A 1/1990 Smazik et al.
5,031,662 A 7/1991 Roethel
5,477,883 A 12/1995 Totten

FOREIGN PATENT DOCUMENTS

WO WO 94/04859 3/1994

* cited by examiner

*Primary Examiner*—Philippe Derakshani
(74) *Attorney, Agent, or Firm*—Liniak, Berenato & White

(57) ABSTRACT

A valve arrangement for dispensing liquid from a flexible container (124) containing a dispenser body (106) connected to a flexible container (124) for containing a liquid and a first biasing means (168) adapted to bias a first closing member (110) to close off a first passage (107) in the container dispenser body (106); and a valve body (118) with a second biasing means (120) adapted to bias a second closing member (116, 118) to close off a second passage (119) defined in the valve body (118); and a dispensing member (122) operatively connected to the valve body (118); and operating means (114, 198, 136) which moves the two bodies (118, 106) into an operative position, against the two biasing means (168, 120) to open the two passages (107, 119) allowing liquid to flow from the flexible container (124) along the first passage (107) and out of the second passage (119).

22 Claims, 13 Drawing Sheets

SELF CLOSING COUPLING

FIELD OF INVENTION

The present invention relates to a valve arrangement for dispensing liquids, in particularly beverages.

BACKGROUND TO INVENTION

When large quantities of beverages and liquid extracts are sold to bars, cinema houses, etc., it is often desirable to sell these in a form to save space and transport costs. The beverage or extract thus is contained in a flexible container such as a flexible pouch of plastics material.

When required, the user couples the flexible container to an existing dispensing member or system, which is fixed in position, and dispenses the beverage or extract for consumption or prior mixing with another beveral or liquid prior to consumption.

From time to time it is necessary to replace the flexible containers containing the beverages or extracts when used up. It is therefore necessary to disconnect the flexible container from the dispensing member or system. The connection of the flexible container to the dispensing member or system is by means of a valve arrangement. This valve arrangement should be simple in construction and inexpensive to make. It should not leak or drip and must not permit ingress of air into the flexible container or into the dispensing member or system. Furthermore, once the flexible container has been connected to the dispensing member or system, the valve arrangement should be easily opened to allow flow of the beverage or liquid extract.

It is an object of the present invention to provide a valve arrangement, which meets the conditions set out above more successfully than other known valve arrangements.

SUMMARY OF INVENTION

According to the invention, a valve arrangement for dispensing liquid from a flexible container, is characterized thereby that it includes a first set of components including:

a) a container dispenser body adapted to be connected on a container side to a flexible container for containing a liquid and on a dispenser side opposite to the container side to a second set of components;

b) a first passage defined in the container dispenser body having an inlet opening on its container side and an outlet opening on its dispenser side;

c) a first closing member adapted to close off the first passage between its outlet opening and the its opening;

d) first biasing means adapted in a position of rest to bias the first closing member to close off the first passage;

and a second set of components including:

e) a valve body adapted to be operatively connected to the container dispenser body;

f) a second passage defined in the valve body and having an inlet opening on its side to face the container dispenser body when connected to its dispenser side and an outlet opening opposite to the inlet opening;

g) a second closing member adapted to close off the second passage between its inlet opening and its outlet opening;

h) second biasing means adapted in a position of rest to bias the second closing member to close off the second passage;

i) a dispensing member operatively connected to the valve body; and j) operating means adapted to move the valve body and the container dispenser body relatively together from their respective positions of rest into an operative position in which the first passage and the second passage are opened against the action of their respective biasing means for allowing liquid to flow along the first passage from the flexible container into the second passage and out of the second passage.

The operating means may include guiding means for rotatably guiding a nut associated with the valve body along at least one spiral groove provided externally on the container body.

The guiding means may include at least one spiral groove provided externally on the container body and associated protrusion(s) provided internally in the nut.

The first closing member may include a stem associated with the first biasing means in the form of a diaphragm body, the diaphragm body being adapted to close off the first passage between its inlet opening and its outlet opening.

The second closing member may include a valve body adapted to close off the second passage between its inlet opening and its outlet opening.

The second biasing means may include a coil spring adapted to act between the dispensing member and the valve body for biasing the valve body relatively towards the container dispenser body during its position of rest.

The arrangement may be made of suitable plastics material, e.g. by injection moulding.

Also according to the invention, a flexible container for liquid with a container valve arrangement for dispensing liquid, is characterized thereby that it includes a first set of components including:

a) a container dispenser body connected on a container side to the flexible container and on an dispenser side being adapted to be connected opposite to the container side to a second set of components;

b) a first passage defined in the container dispenser body having an inlet opening on its container side and an outlet opening on its dispenser side;

c) a first closing member adapted to close off the first passage between its outlet opening and its inlet opening; and d) first biasing means adapted in a position of rest to bias the first closing member to close off the first passage.

Further according to the invention, a dispensing arrangement for dispensing liquid from a flexible container, characterized thereby that it includes a second set of components including:

a) a valve body adapted to be operatively connected to a container dispenser body;

b) a second passage defined in the valve body and having an inlet opening on its side to face the container dispenser body when connected to its dispenser side and an outlet opening opposite to the inlet opening;

c) a second closing member adapted to close off the second passage between its inlet opening and its outlet opening;

d) second biasing means adapted in a position of rest to bias the second closing member to close off the second passage between its inlet opening and its outlet opening;

e) a dispensing member operatively connected to the valve body; and f) operating means adapted to move the valve body and the container dispenser body relatively together from their respective position of rest into an operative position in which the first passage in a container dispenser body to which it is connected and the second passage are opened against the action of their respective biasing means for allowing liquid to flow from the first passage into the second passage and out of the second passage.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
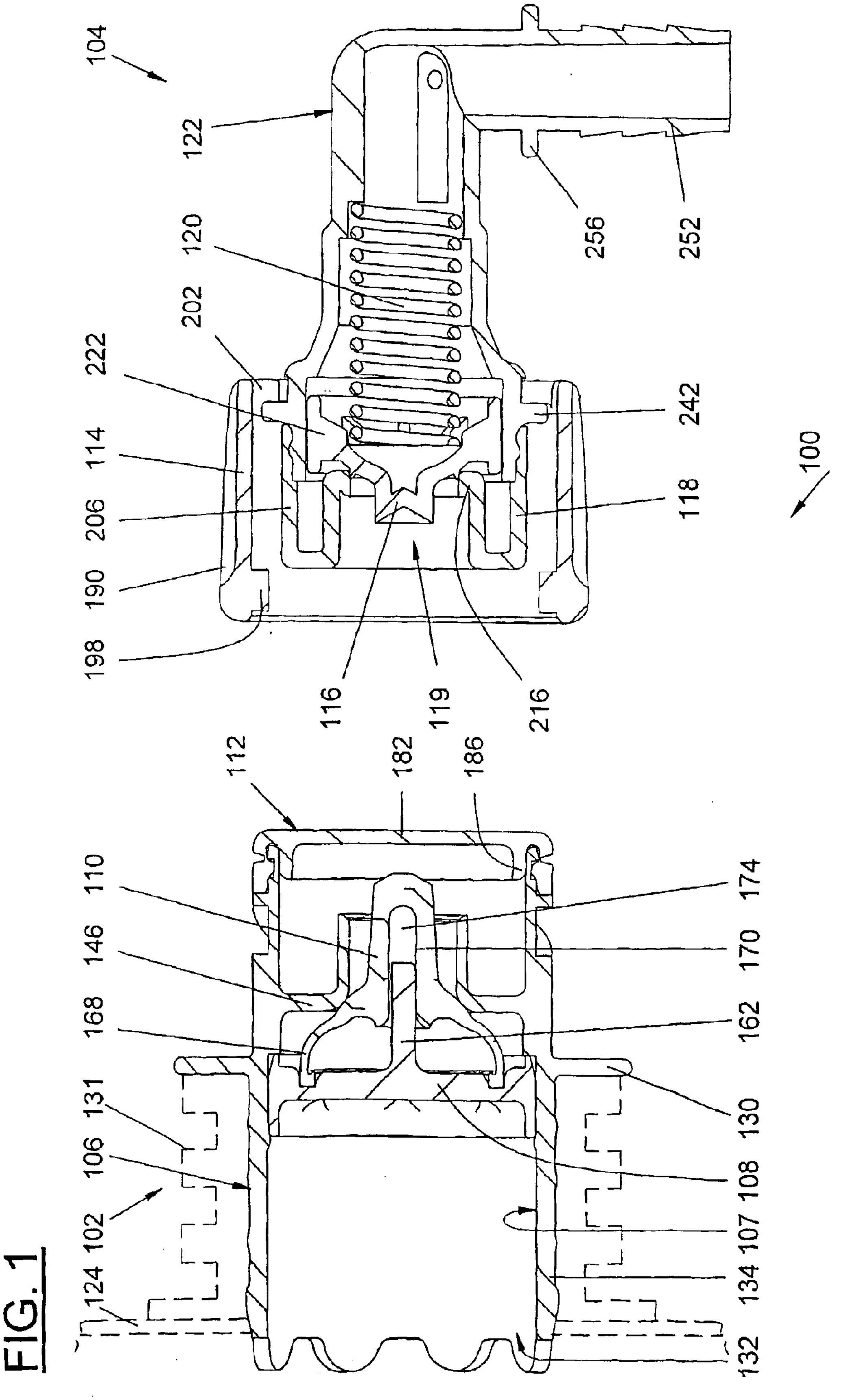
FIG. 1: a sectional side view of a valve arrangement in accordance with the invention prior to assembly.
Figure 2:
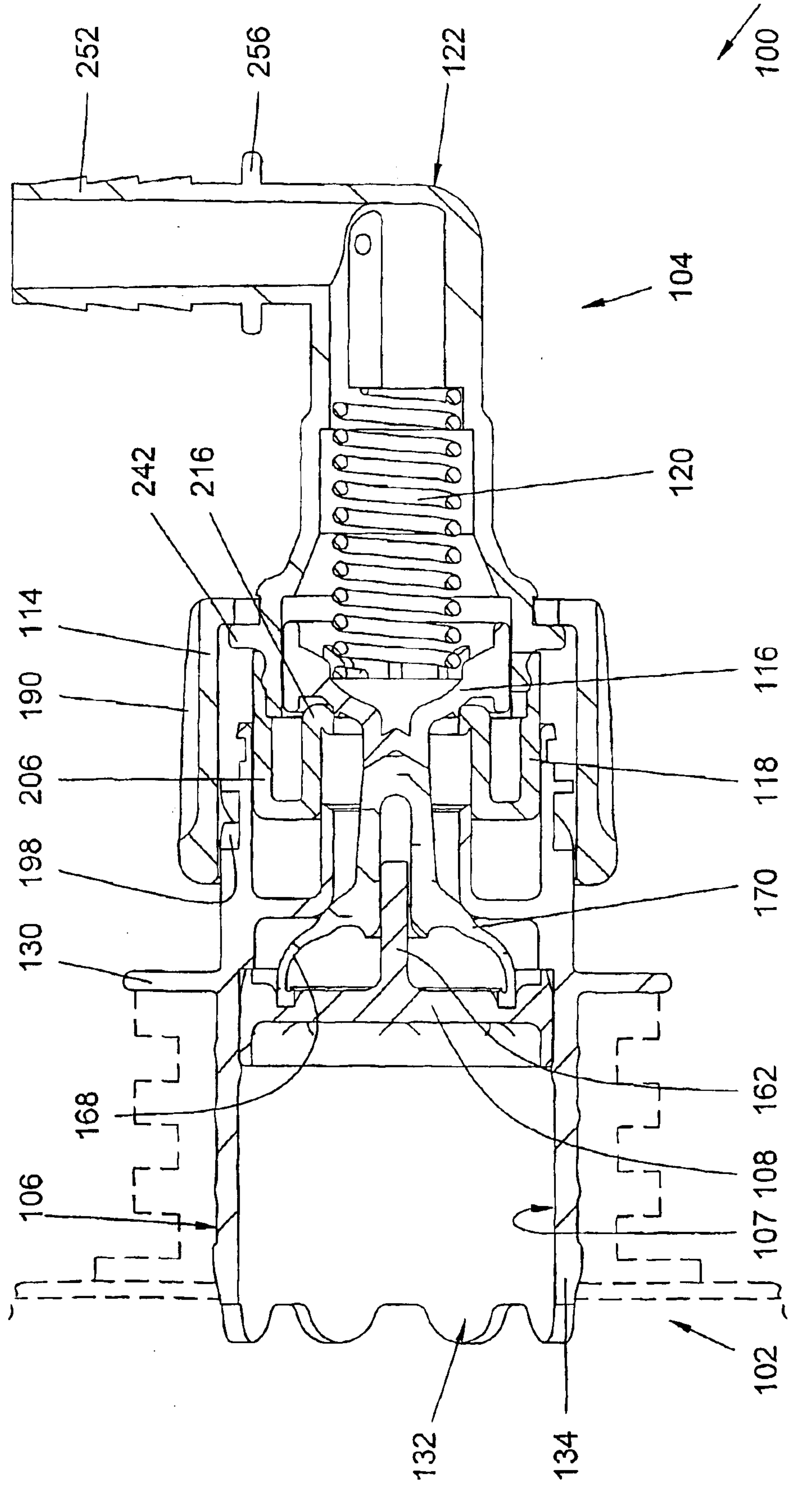
FIG. 2: a view corresponding to FIG. 1 but showing the assembled valve arrangement in the closed position or position of rest.
Figure 3:
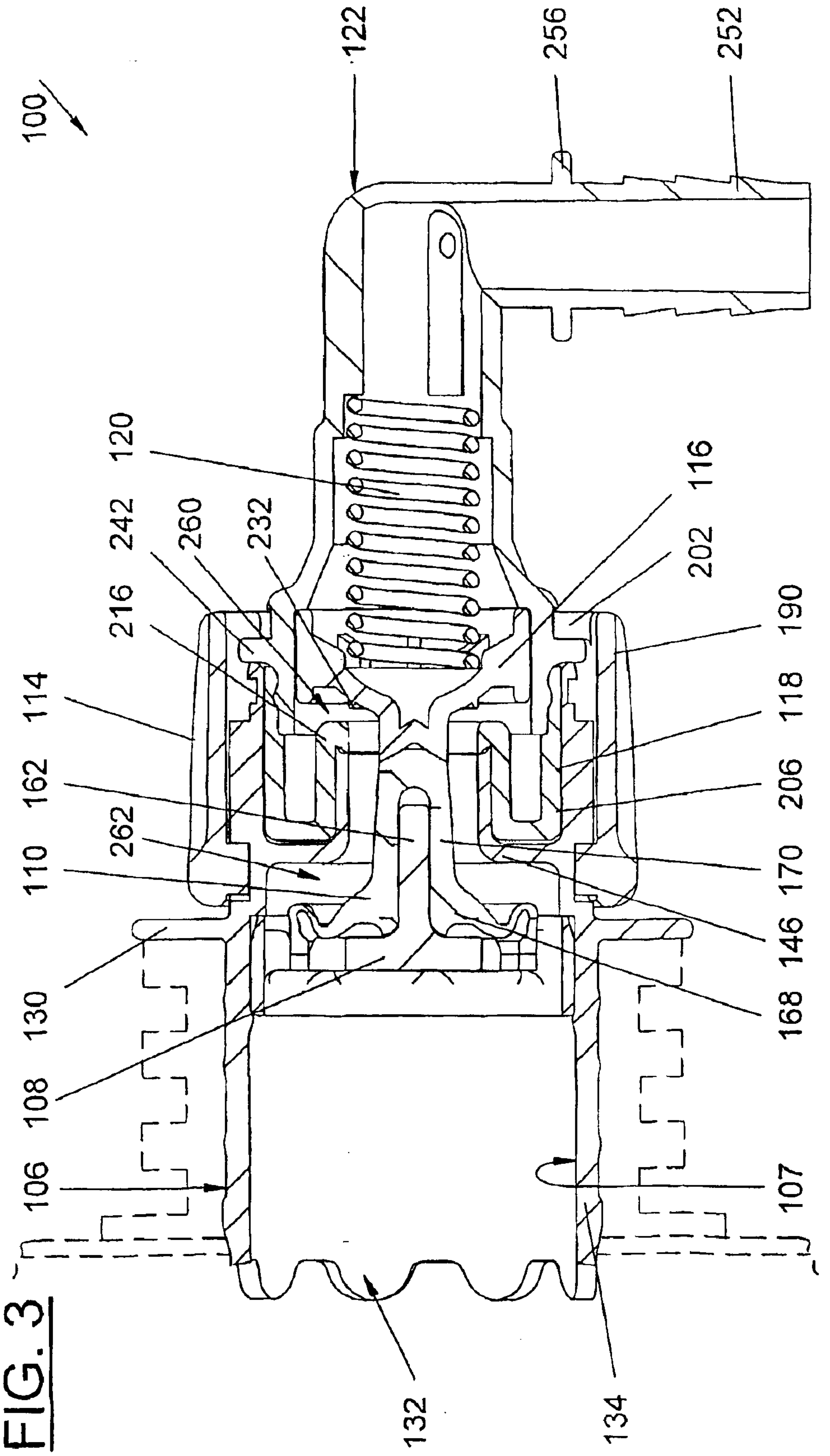
FIG. 3: a view corresponding to FIG. 2 but showing the assembled valve arrangement in the open position.
Figure 4:
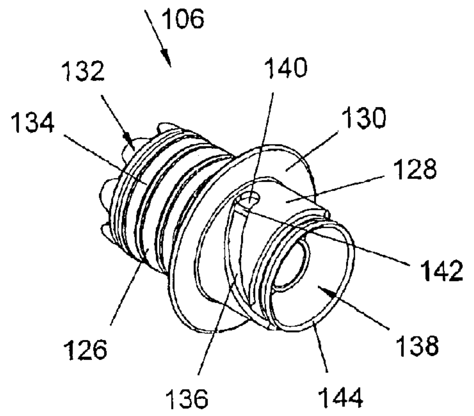
FIG. 4: a pictorial view of the container dispenser body of the valve arrangement illustrated in FIGS. 1 to 3.
Figure 5:
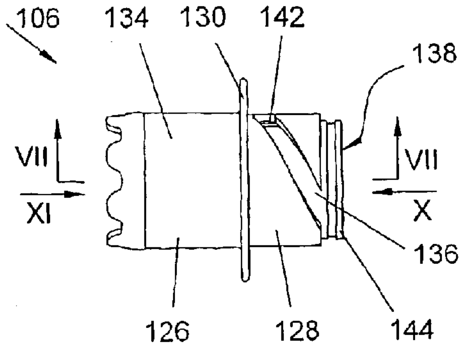
FIG. 5: an outside view of the container dispenser body shown in FIG. 4.
Figure 6:
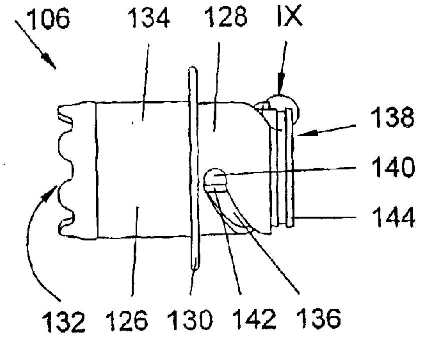
FIG. 6: a view of the container dispenser body corresponding to FIG. 5 but turned through 90°.
Figure 7:
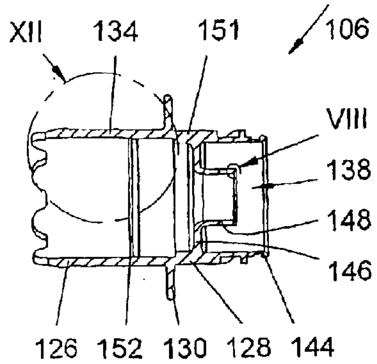
FIG. 7: a sectional side view of the container dispenser body seen along arrows VII—VII in FIG. 5.
Figure 9:
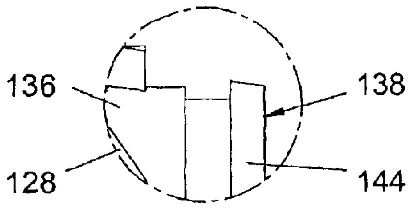
FIG. 9: an enlarged detail indicated by arrow IX in FIG. 6.

Referring to FIGS. 1 to 3, a valve arrangement in accordance with the invention, generally indicated by reference numeral 100, is shown.

The valve arrangement 100 includes a first set of components indicated by reference numeral 102 and a second set of associated components indicated by reference numeral 104. The first set of components 102 are adapted to be attached to a pouch or flexible container containing a beverage, e.g. wine, or a liquid extract, e.g. for making a soft drink.

The second set of components 104 are located at a dispensing location, e.g. in a bar or restaurant, a factory, an office or in domestic premises.

The first set of components 102 include a container dispenser body 106 having an internal passage 107, a valve stopper 108, and a diaphram body 110.

Prior to use, the first components 102 are closed off by means of a closure cap 112.

The second set of components 104 include an operating nut 114, a first valve body 116, a second valve body 118 having an internal passage 119, a stainless steel coil spring 120 and a dispenser fitting 122.

FIG. 2 shows the assembled valve arrangement with the first set of components attached to a flexible container or bag 124 and with the closure cap 112 removed so that the second set of components 104 can be fitted to the first set of components. In this position the valve arrangement 100 is in the closed position and no liquid can flow from the flexible container 124 through the passages 107 and 119 to the dispenser fitting 122.

In FIG. 3 the operating nut 114 has been rotated so as to cause the valve arrangement 100 to open and to allow flow of the beverage from the flexible container 124 through the valve arrangement and along the dispenser fitting 122 for dispensing purposes.

The operation of the valve arrangement 100 will be described in more detail after the description of the various components as set out below.

Referring to FIGS. 4 to 12 the container dispenser body 106 is illustrated.

The body 106 has a first tubular part 126 and a second tubular part 128 between which a disc 130 is provided. The first tubular part 106 is adapted to be inserted through a gland 131 in a flexible container 124.

The second part 128 therefore protrudes to the outside of the gland 131 of the flexible container 124.

The first part 106 is provided at its open end 132 with a scallop type of formation so as to prevent the open end to be closed off by an opposite part of a flexible container 124 as it reaches its empty stage and collapses under atmospheric pressure.

On the outside of the first part 126 a number of rings 134 are provided. These rings 134 are tightly and sealingly fitted to the gland 131 provided in a flexible container 124.

The second part 128 has two opposite spiral grooves 136 which extend from the open end 138 of the second part 128 up to adjacent the disc 130. At the disc 130 the spiral groove 136 extends into a straight part 140 and a step 142 is provided between the part 140 and the spiral groove 136.

Figure 8:
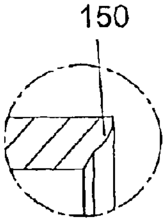
FIG. 8: an enlarged detail indicated by arrow VIII in FIG. 7.
Figure 11:
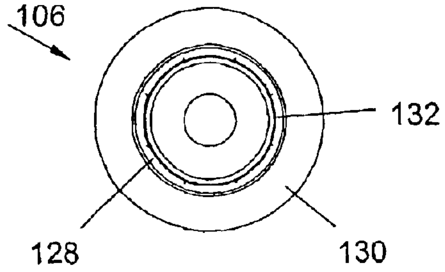
FIG. 11: an end view of the container dispenser body seen along arrow XI in FIG. 5.
Figure 10:
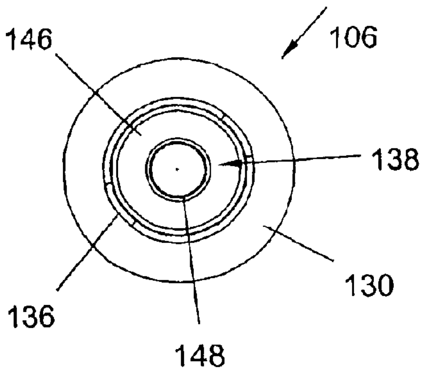
FIG. 10: an end view of the container dispenser body seen along arrow X in FIG. 5.
Figure 12:
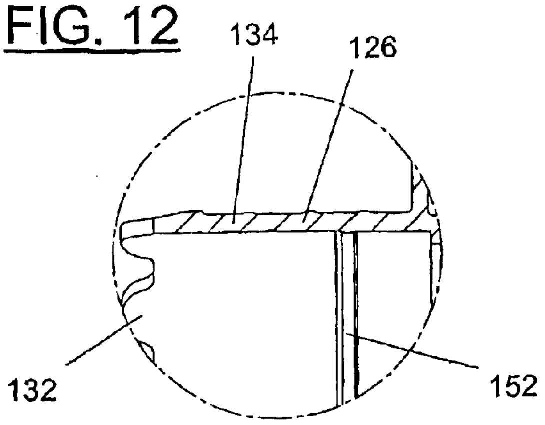
FIG. 12: an enlarged detail indicated by arrow XII in FIG. 7.
Figure 13:
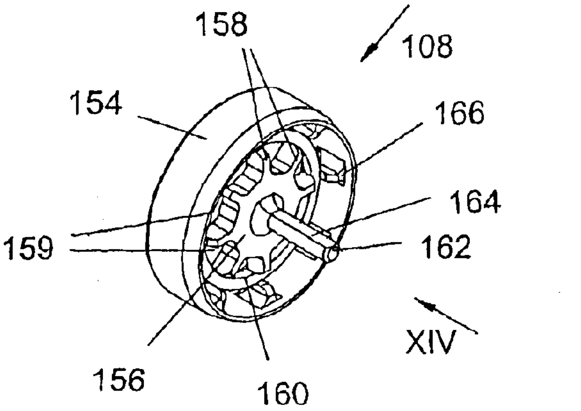
FIG. 13: a pictorial view of the valve stopper of the valve arrangement illustrated in FIGS. 1 to 3.
Figure 14:
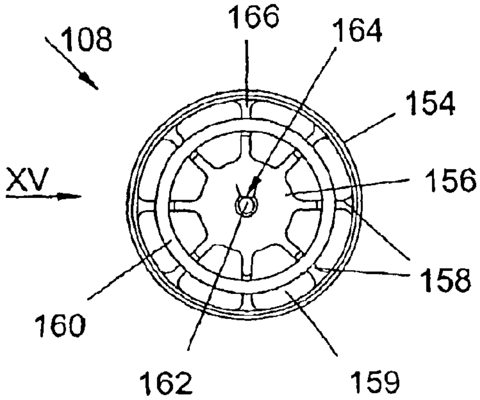
FIG. 14: an end view of the valve stopper seen along arrow XIV in FIG. 13.
Figure 15:
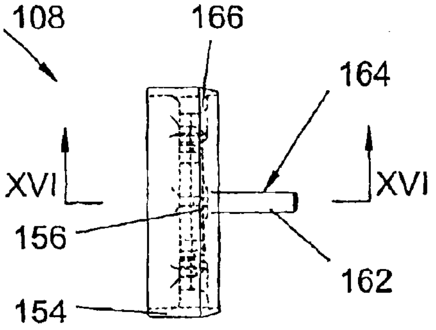
FIG. 15: a side view of the valve stopper seen along arrow XV in FIG. 14.
Figure 16:
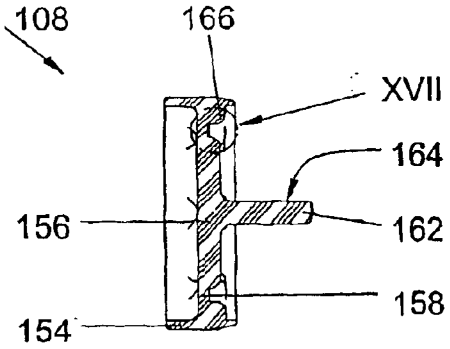
FIG. 16: a sectional side view of the valve stopper seen along arrows XVI—XVI in FIG. 15.

At the end 138 an annular ridge 144 is provided. On its inside the second part 128 is provided with an inwardly directed collar 146 from which there extends an annular ring 148. The annular ring 148 terminates in an inclined step formation 150 as shown in FIG. 8.

On the inside a step 151 is provided adjacent the collar 146 directed to the open end 132 of the first part 126.

An annular ridge 152 is provided in the first part 126.

The valve stopper 108 is illustrated in FIGS. 13 to 17.

The valve stopper 108 has an annular ring 154 with a central hub 156 which is joined to the annular ring 154 by means of radial arms 158 defining spaces 159 between them. Between the ring 154 and the hub 156 an intermediate ring 160 is provided. Flow can take place through the spaces 159.

A stem 162 extends from the hub 156. As can be seen from FIGS. 13 and 14 the stem 162 is flattened on one side 164.

Figure 17:
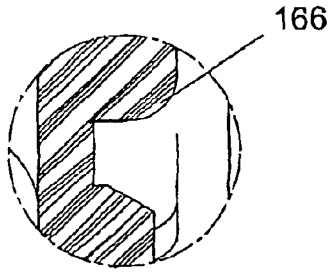
FIG. 17: an enlarged detail indicated by arrow XVII in FIG. 16.
Figure 18:
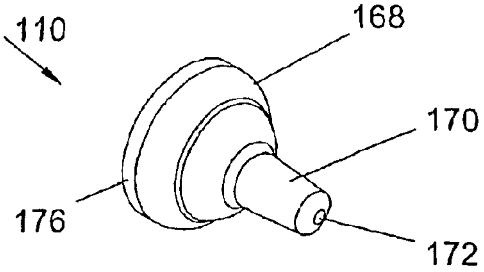
FIG. 18: a pictorial view of the diaphram body of the valve arrangement illustrated in FIGS. 1 to 3.

Furthermore, as indicated in FIG. 17 a raised section 166 is provided adjacent the annular ring 154.

The diaphram body 110 is illustrated in FIGS. 18 to 22. The diaphram body 110 includes a cup 168 from which a stem 170 extends. At its end the stem 170 is provided with a frusto-conical formation 172. The stem 170 includes a hollow cylindrical passage 174.

Figure 22:
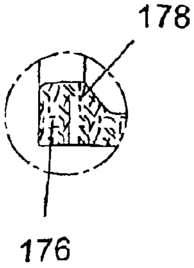
FIG. 22: an enlarged detail indicated by arrow XXII in FIG. 21.
Figure 23:
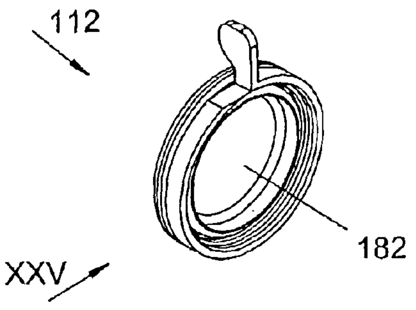
FIG. 23: a pictorial view of the pilfer-proof closure cap of the valve arrangement illustrated in FIGS. 1 to 3.
Figure 24:
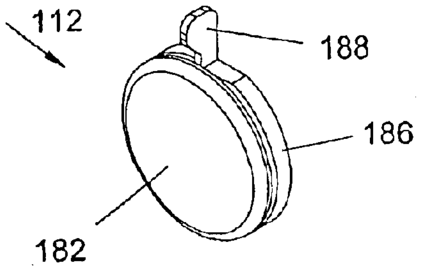
FIG. 24: a pictorial view of the closure cap of FIG. 23 seen from the opposite side.
Figure 25:
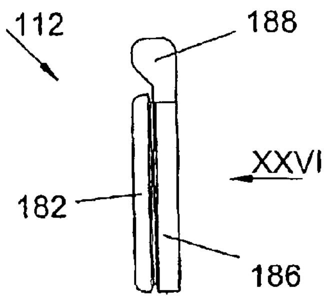
FIG. 25: a side view of the closure cap seen along arrow XXV in FIG. 23.
Figure 26:
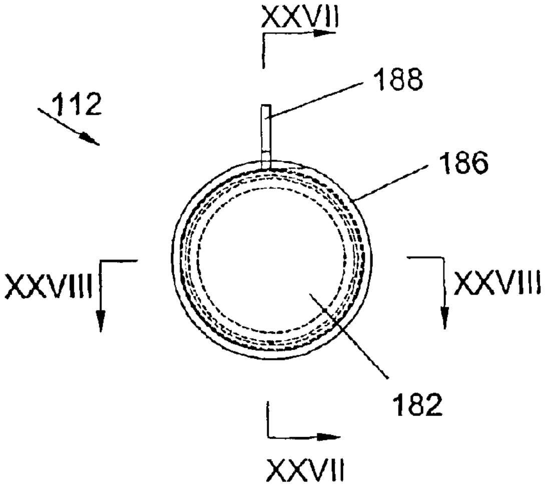
FIG. 26: an end view of the closure cap seen along arrow XXVI in FIG. 25.
Figure 27:
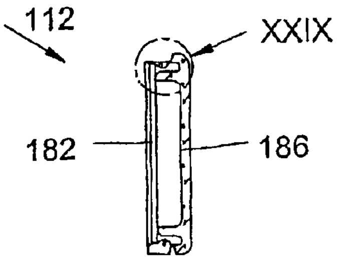
FIG. 27: a sectional side view of the closure cap seen along arrows XXVII—XXVII in FIG. 26.
Figure 28:
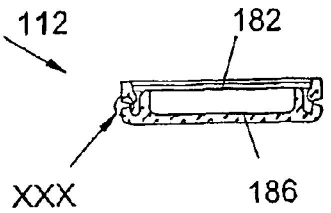
FIG. 28: a sectional side of the closure cap seen along arrows XXVIII—XXVIII in FIG. 26.
Figure 29:
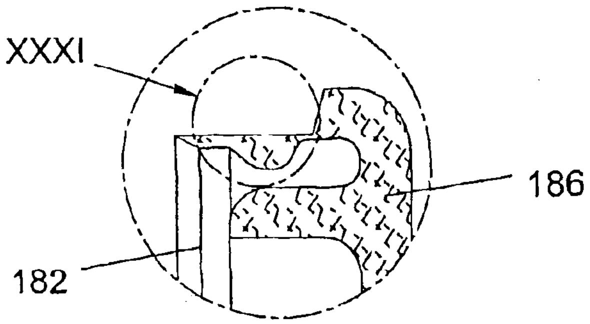
FIG. 29: an enlarged detail indicated by arrow XXIX in FIG. 27.
Figure 30:
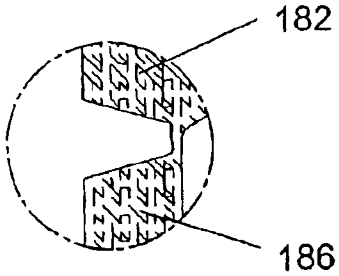
FIG. 30: an enlarged detail indicated by arrow XXX in FIG. 28.
Figure 31:
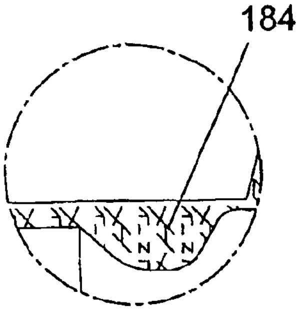
FIG. 31: an enlarged detail indicated by arrow XXXI in FIG. 29.

The annular end 176 of the cup 168 is provided with a thickened annular ring portion 178 as shown in FIG. 22.

Figure 19:
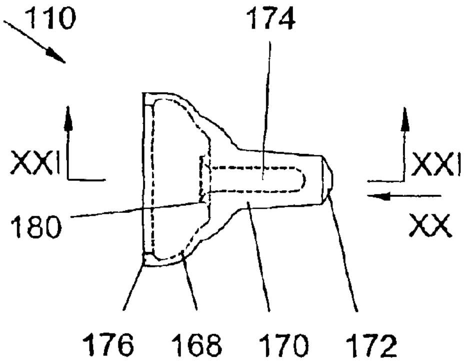
FIG. 19: a side view of the diaphram body shown in FIG. 18.
Figure 20:
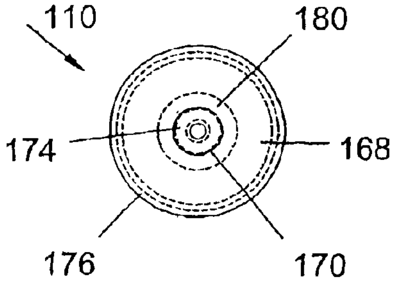
FIG. 20: an end view of the diaphram body seen along arrow XX in FIG. 19.
Figure 21:
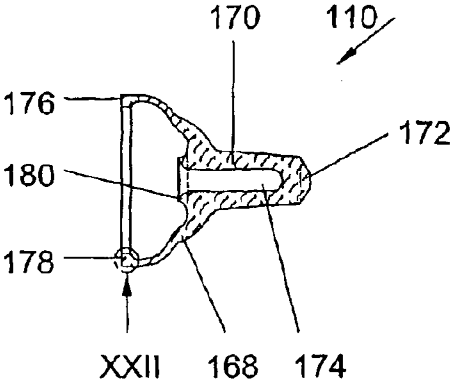
FIG. 21: a sectional side view of the diaphram body seen along arrow XXI—XXI in FIG. 19.

At the beginning of the passage 174 a thickened annular section 180 is provided as shown in FIGS. 19 and 21.

The closure cap 112 is illustrated in FIGS. 23 to 31.

The closure cap 112 includes a disc 182 attached by way of a tearable section 184 to a ring 186. A gripping tab 188 is joined to the ring 186.

The cap 112 is fitted to the outside of the annular body 106 as shown in FIG. 1.

In FIGS. 32 to FIGS. 35 the operating nut 114 is illustrated.

The operating nut 114 includes a cylindrical body 190 on the outside of which a number of longitudinal recesses 192 and ridges 194 are provided for gripping purposes.

Figure 32:
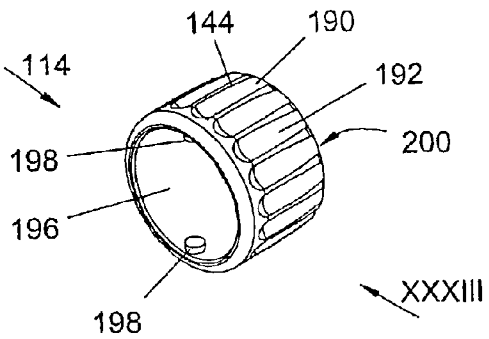
FIG. 32: a pictorial view of the operating nut of the valve arrangement illustrated in FIGS. 1 to 3.
Figure 33:
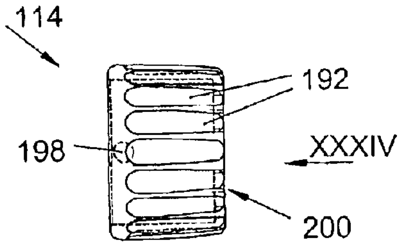
FIG. 33: a side view of the operating nut seen along arrow XXXIII in FIG. 32.
Figure 34:
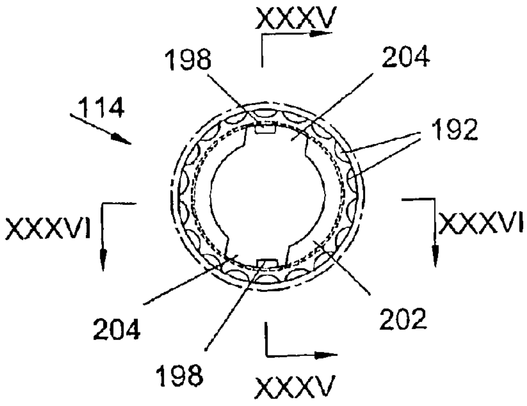
FIG. 34: an end view of the operating nut seen along arrow XXXIV in FIG. 33.
Figure 35:
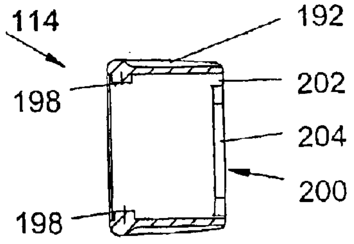
FIG. 35: a sectional side view of the operating nut seen along arrows XXXV—XXXV in FIG. 34.
Figure 36:
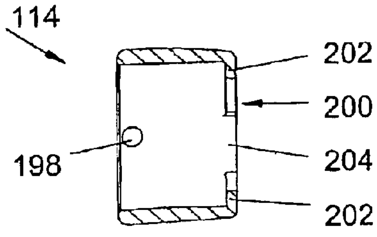
FIG. 36: a sectional side view of the operating nut seen along arrows XXXVI—XXVI in FIG. 34.

The body 190 is slightly tapered as is in particular clear from FIGS. 32, 33 and 35.

At its one open end 196 the operating nut 114 has two opposite knobs 198 which co-operate with the spiral grooves 136 of the container dispenser body 106 shown in FIGS. 4 to 7.

At its opposite end 200 the nut 114 has an inwardly directed collar 202 which is divided into two parts by way of two opposite cut-outs 204.

Figure 37:
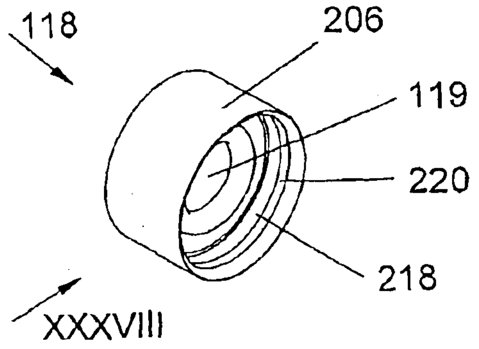
FIG. 37: a pictorial view of the second valve body of the valve arrangement illustrated in FIGS. 1 to 3.
Figure 38:
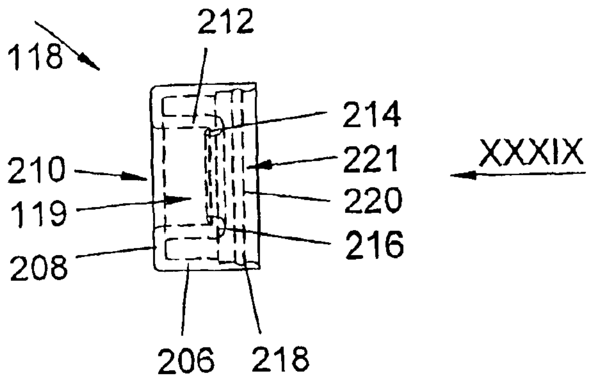
FIG. 38: a side view of the second valve body seen along arrow XXXVIII in FIG. 37.
Figure 39:
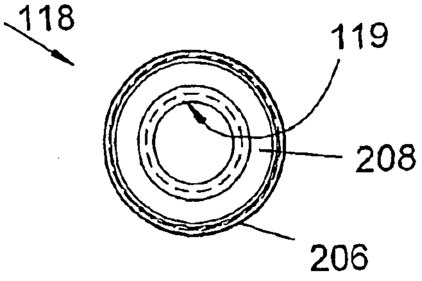
FIG. 39: an end view of the second valve body seen along arrow XXXIX in FIG. 38.
Figure 41:
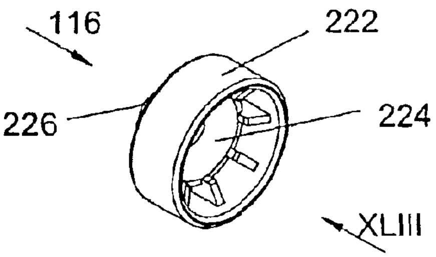
FIG. 41: a pictorial view of the first valve body shown in FIG. 40 but seen from the opposite side.
Figure 40:
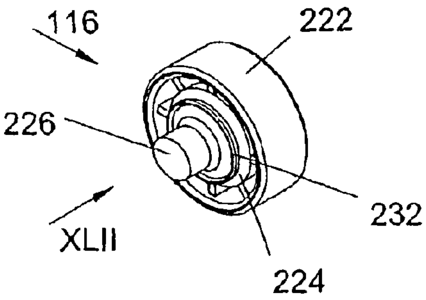
FIG. 40: a pictorial view of the first valve body of the valve arrangement illustrated in FIGS. 1 to 3.
Figure 43:
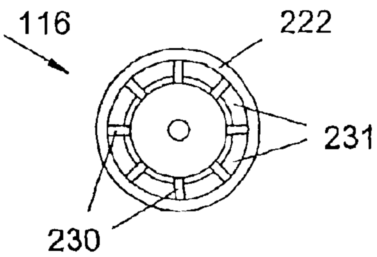
FIG. 43: an opposite end view of the first valve body seen along arrow XLIII in FIG. 41.
Figure 42:
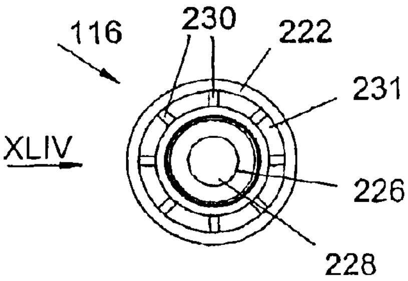
FIG. 42: an end view of the first valve body seen along arrow XLII in FIG. 40.
Figure 45:
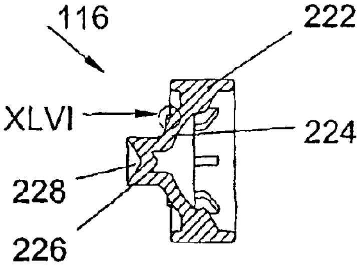
FIG. 45: a sectional side view of the first valve body seen along arrows XLV—XLV in FIG. 44.
Figure 44:
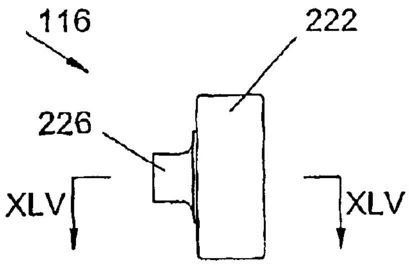
FIG. 44: a side view of the valve body seen along arrow XLIV in FIG. 42.
Figure 46:
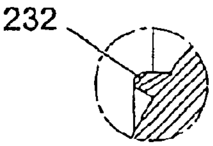
FIG. 46: on an enlarged scale a detail indicated by arrow XLVI in FIG. 45.
Figure 47:
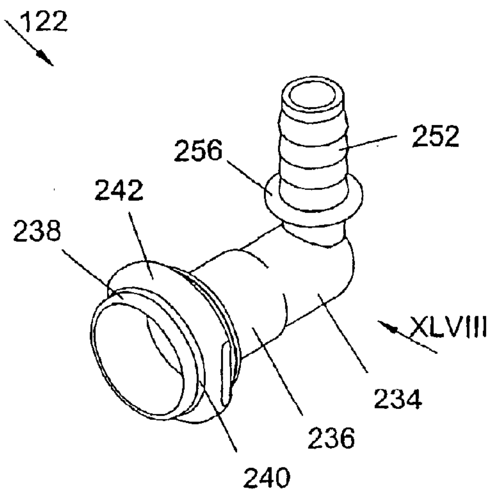
FIG. 47: a pictorial view of a dispenser fitting of a valve arrangement illustrated in FIGS. 1 to 3.
Figure 48:
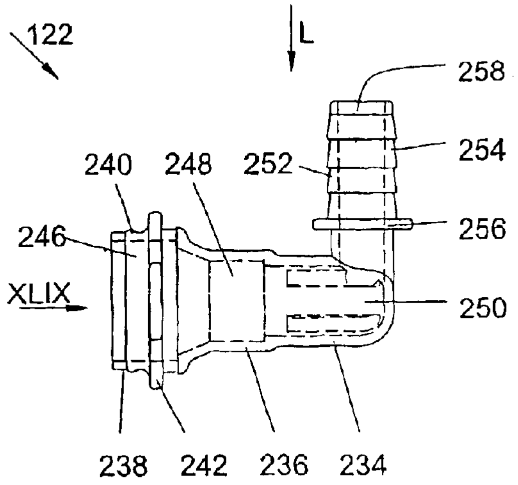
FIG. 48: a side view of the dispenser fitting seen along arrow XLVIII in FIG. 47.
Figure 49:
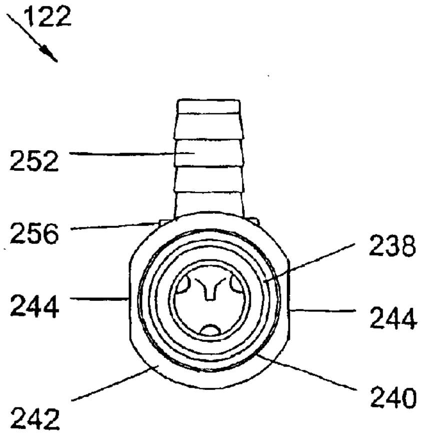
FIG. 49: a view of the dispenser fitting seen along arrow XLIX in FIG. 48.
Figure 50:
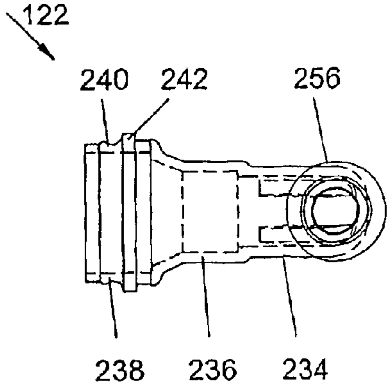
FIG. 50: a view of the dispenser fitting seen along arrow L in FIG. 48.

The second valve body 118 is illustrated in FIGS. 37 to 39. The second valve body 118 has a cylindrical part 206 having an inwardly directed collar 208 at an inlet opening 210 of the passage 119, the collar 208 passing over into an internal ring 212. The ring 212 has a bent-over part 214 with an annular seat 216.

On the inside surface 218 of the ring 206 a number of concentric rings 220 are provided at the outlet opening 221 opposite the inlet opening 210.

The first valve body 116 is illustrated in FIGS. 40 to 46. The first valve body 116 includes an annular ring 222, which has on its inside a cup-shaped formation 224. Centrally the cup-shape formation 224 has a stem part 226 having a recess 228 at one end.

The cup-shaped formation 224 is supported by radial arms 230 defining gaps 231 between them. Flow can take place through the gaps 231.

An annular ridge 232 is provided on the cup-shaped part 224 concentric to the stem 226.

In FIGS. 47 to 50 the dispenser fitting 122 is shown. The dispenser fitting 122 has a first tubular part 234 joined to a second tubular part 236 having an increased diameter and, which in turn terminates in a third tubular part 238 with an even larger diameter.

The tubular part 238 is provided with a ring 240 on its outer surface and carries an annular outwardly directed collar 242, which has two opposite flattened surfaces 244.

The part 238 has an internal passage 246 leading into a passage 248 which further leads into a passage 250 in the part 234. From the part 234 a spigot 252 extends with engagement rings 254 on the outside and a disc 256 close to the part 234. The passage 250 is in communication with a further passage 258 in the spigot 252.

In use, the first set of components 102 are attached to a flexible container 124 in that the container dispenser body 106 is tightly and sealingly fitted by way of the rings 134 to the gland 131 fixed to the flexible container 124. The flexible container 124 is filled with a beverage or liquid extract. The beverage (or extract) cannot flow out through the dispenser body 106 because the cup 168 of the diaphragm body 110 abuts sealingly against the inwardly directed collar 146 of the second part 128.

Similarly the second set of components 104 joined to a dispenser member (e.g. a tap—not shown) connected to the dispenser fitting 122 is closed off and no backflow can take place. This is achieved in that the spring 120 presses the first valve body 116 so that the annular ridge 232 abuts sealingly against the annular seat 216. This is also the position of rest when the operating nut 114 is uncoupled from the second part 128).

When the operating nut 114 is coupled to the second part 128 the closed position is as illustrated in FIG. 2. However, on rotating the nut 114 through 90° in that the knobs 198 slide in the grooves 136, the stem 170 presses the first valve body 116 against the biasing action of the spring 120 (as shown in FIG. 3) so that the annular ridge 232 is moved away from the seat 216 to open an annular gap 260 and simultaneously the cup 168 of the diaphragm body 116 is pushed together so that it lifts off the collar 146 to provided an annular gap 262 through which beverage can flow from the flexible container 124 through the passages 107 and 119 to be dispensed by way of the dispenser spigot 252 wherever required.

Reference Numerals

100 valve arrangement or valve
102 first set of components
104 second set of associated components
106 container dispenser body
107 internal passage
108 valve stopper
110 diaphram body
112 closure cap
114 operating nut
116 first valve body
118 second valve body
119 internal passage
120 stainless steel coil spring
122 dispenser fitting
124 flexible container or pouch
126 first tubular part
128 second tubular part
130 disc
131 gland
132 open end
134 rings
136 spiral groove
138 open end of the second part
140 straight part
142 step
144 annular ridge
146 inwardly directed collar
148 annular ring
150 curved formation
151 step
152 annular ring
154 annular ring
156 central hub
158 radial arms
159 spaces
160 intermediate ring
162 stem
164 flattened side of stem
166 raised section
168 cup
162 stem
172 frosto-conical formation
174 passage
176 annular end
178 thickened annular ring portion
180 thickened annular section
182 disc
184 tearable section
186 ring
188 gripping tab
190 cylindrical body
192 longitudinal recesses
194 longitudinal ridges
196 open end
198 two opposite knobs
200 opposite end
202 inwardly directed collar
204 two opposite cut-outs
206 cylindrical part
208 collar
210 inlet opening
212 internal ring
214 bent-over part
216 annular seat
218 inside surface of ring
220 concentric rings
222 annular ring
224 cup-shaped formation
226 stem
228 recess
230 radial arms
231 gaps
232 annular ridge
234 first tubular part
236 second tubular part
238 third tubular part
240 ring
242 annular outwardly directed collar
244 flattened surface
246 passage
248 passage
250 passage
252 spigot
254 engagement rings
256 disc
258 passage
260 annular gap
262 annular gap

What is claimed is:

1. A valve arrangement for dispensing liquid from a flexible container (124), characterized thereby that it includes a) a container dispenser body (106) adapted to be connected to a flexible container (124) for containing a liquid;

b) a passage (107) defined in the container dispenser body (106) having an inlet opening (132) and an outlet opening (138);

c) a closing member (110) centrally, movably located in the container dispenser body (106) and being adapted to close off the passage (107) between its outlet opening (138) and its inlet opening (132);

d) biasing means (168) integrally formed with the closing member (110) and being adapted in a position of rest to bias the closing member (110) to close off the passage (107); and e) a stem (162) adapted to guide and limit movement of the closing member (110) so that said closing member (110) is movable relative to said stem (162).

2. A valve arrangement as claimed in claim 1, characterized thereby that the closing member (110) and biasing means (168) are formed by a diaphragm body.

3. A valve arrangement as claimed in claim 1, characterized thereby that the closiong member (110) is adapted to be pushed together.

4. A valve arrangement as claimed in claim 1, characterized thereby that the closing member (110) is substantially conically shaped.

5. A valve arrangement as claimed in claim 1, characterized thereby that a passage (174) is provided in the closing member (110).

6. A valve arrangement as claimed in claim 5, characterized thereby that the passage (174) is cylindrical in shape.

7. A valve arrangement as claimed in claim 1, characterized thereby that the closing member (110) is slidably located on the stem (162).

8. A valve arrangement as claimed in claim 5, characterized thereby that the stem (162) is slidably provided within the passage (174).

9. A valve arrangement as claimed in claim 1, characterized thereby that the stem (162) is located in the container dispenser body (106) so that it is located between the closing member (110) and the inlet opening (132).

10. A valve arrangement as claimed in claim 1, characterized thereby that the stem (162) is provided with spaces (159) through which a fluid may pass during use.

11. A valve arrangement as claimed in claim 1, characterized thereby that it is made of suitable plastics material.

12. A valve arrangement as claimed in claim 11, characterized thereby that it is manufactured by injection moulding.

13. A valve arrangement for dispensing liquid from a flexible container (124), characterized thereby that it includes a) a valve body (118);

b) a passage (119) defined in the valve body (118) and having an inlet opening (210) and an outlet opening (221) opposite to the inlet opening (210);

c) a closing member (116, 118) adapted to close off the passage (119) between its inlet opening (210) and its outlet opening (221);

d) biasing means (120) adapted in a position of rest to bias the closing member (116, 118) to close off the passage (119); and e) an annular ridge (232) integrally formed with the closing member (116, 118), the annular ridge (232) being adapted to be in sliding circumferential contact with an annular seat (216) of the valve body (118).

14. A valve arrangement for dispensing liquid from a flexible container (124), characterized thereby that it includes a first set of components (102) including:

a) a container dispenser body (106) adapted to be connected on a container side to a flexible container (124) for containing a liquid and on a dispenser side opposite to the container side to a second set of components (104);

b) a first passage (107) defined in the container dispenser body (106) having an inlet opening (132) on its container side and an outlet opening (138) on its dispenser side;

c) a first closing member (110) centrally, movably located in the container dispenser body (106) and being adapted to close off the first passage (107) between its outlet opening (138) and its inlet opening (132);

d) first biasing means (168) integrally formed with the closing member (110) and being adapted in a position of rest to bias the first closing member (110) to close off the first passage (107);

e) a stem (162) adapted to guide and limit movement of the closing member (110); and a second set of components (104) including:

a) a valve body (118) adapted to be operatively connected to the container dispenser body (106);

b) a second passage (119) defined in the valve body (118) and having an inlet opening (210) on its side to face the container dispenser body (106) when connected to its dispenser side and an outlet opening (221) opposite to the inlet opening (210);

c) a second closing member (116, 118) adapted to close off the second passage (119) between its inlet opening (210) and its outlet opening (221);

d) second biasing means (120) adapted in a position of rest to bias the second closing member (116,118) to close off the second passage (119); and e) an annular ridge (232) integrally formed with the closing member (116, 118), the annular ridge (232) being adapted to be in sliding circumferential contact with an annular seat (216) of the valve body (118).

15. A valve arrangement as claimed in claim 14, characterized thereby that it includes operating means (114, 198, 136) adapted to move the valve body (118) and the container dispenser body (106) relatively together from their respective positions of rest into an operative position in which the first passage (107) and the second passage (119) are opened against the action of their respective biasing means (168, 120) for allowing liquid to flow along the first passage (107) from the flexible container (124) into the second passage (119) and out of the second passage (119).

16. A valve arrangement as claimed in claim 15, characterized thereby that the operating means (114, 198, 136) includes guiding means (198, 136) for rotatably guiding a nut (114) associated with the valve body (118) along at least one spiral groove (136) provided externally on the container body (106).

17. A valve arrangement as claimed in claim 16, characterized thereby that the guiding means (198, 136) includes at least one spiral groove (136) provided externally on the container body (106) and associated protrusion(s) (198) provided internally in the nut (114).

18. A valve arrangement as claimed in claim 14, characterized thereby that the first closing member (110) includes a stem (162) associated with the first biasing means in the form of a diaphragm body (168), the diaphragm body (168) being adapted to close off the first passage (107) between its inlet opening (132) and its outlet opening (138).

19. A valve arrangement as claimed in claim 14, characterized thereby that the second closing member (116, 118) includes a valve body (116) adapted to close off the second passage (119) between its inlet opening (210) and its outlet opening (221).

20. A valve arrangement as claimed in claim 14, characterized thereby that the second biasing means includes a coil spring (120) adapted to act between the dispensing member (122) and the valve body (116) for biasing the valve body (116) relatively towards the container dispenser body (106) during its position of rest.

21. A valve arrangement as claimed in claim 14, characterized thereby that it is made of suitable plastics material.

22. A valve arrangement as claimed in claim 21, characterized thereby that it is manufactured by injection moulding.

* * * * *